UNITED STATES PATENT OFFICE.

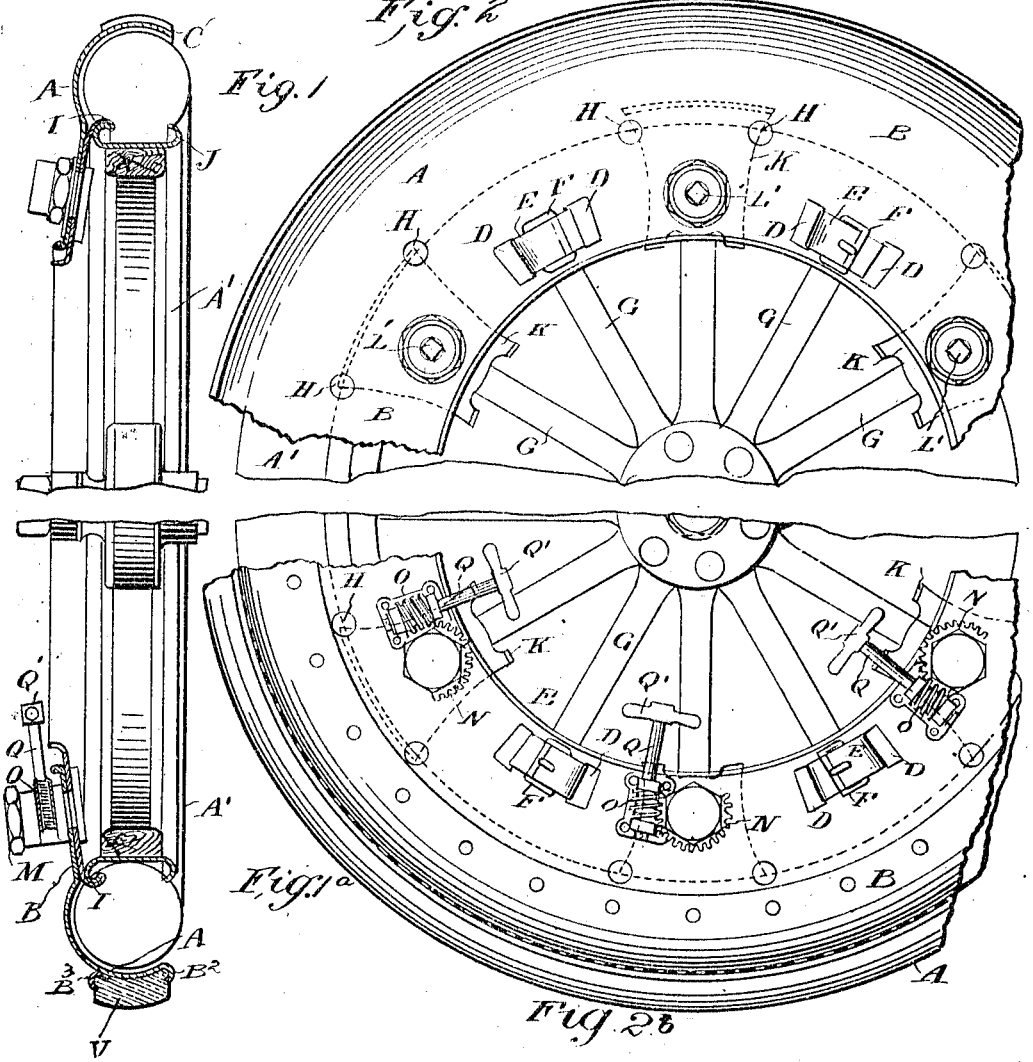

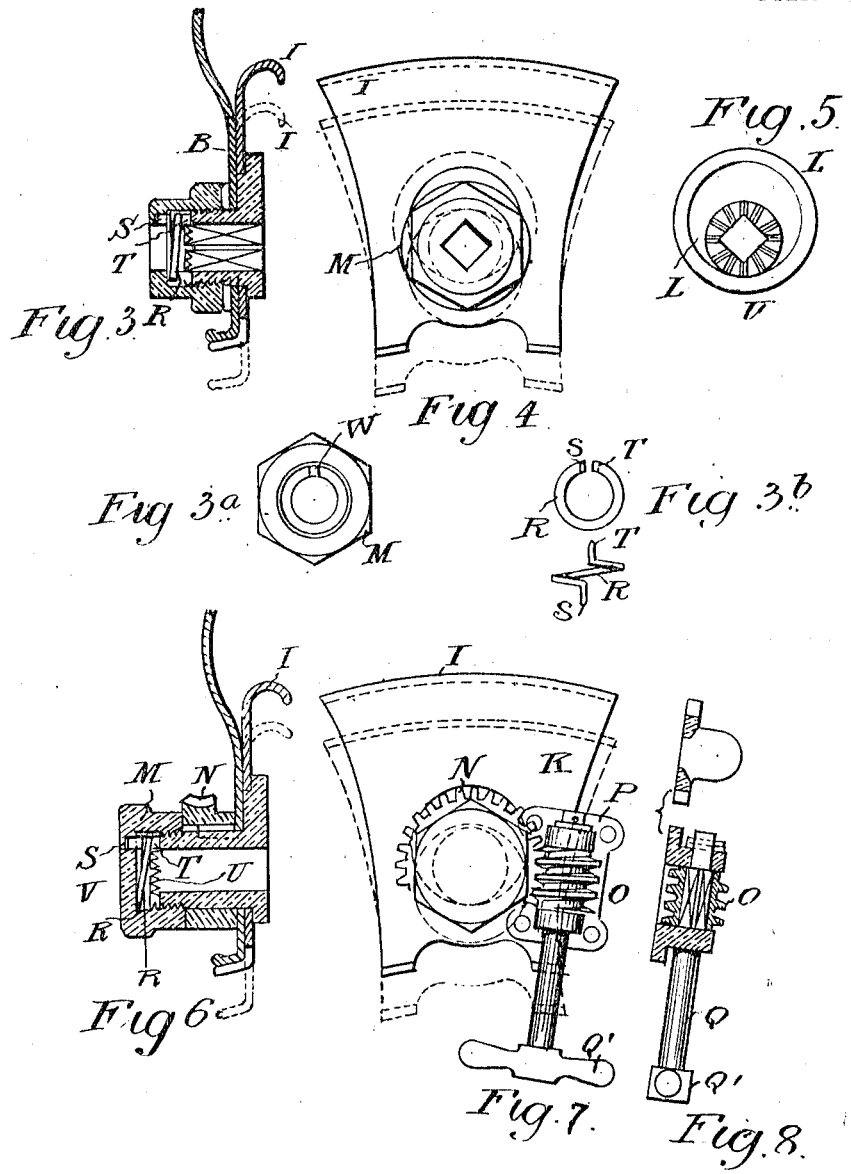

ALEXANDER TURNBULL, OF GLASGOW, SCOTLAND.

TIRE-ARMOR.

1,055,372.   Specification of Letters Patent.   Patented Mar. 11, 1913.

Application filed May 17, 1909. Serial No. 496,564.

*To all whom it may concern:*

Be it known that I, ALEXANDER TURN-BULL, of the firm of Alexander Turnbull & Co. Limited, of St. Mungo Works, Bishop-briggs, Glasgow, Scotland, engineers, have invented certain new and useful Tire-Armor, of which the following is a specification.

This invention which relates to emergency or other auxiliary tires and the means of fixing the same to wheels of road vehicles, has for its object to overcome the difficulty and inconvenience occasioned by the puncture or other damage of the tire.

In order that my invention may be properly understood and readily carried into effect, I have hereunto appended two sheets of drawings, of which:—

Figure 1 is a view in vertical section of one embodiment of my invention. Fig. 2 is a view in side elevation of one half of a wheel showing the embodiment illustrated in Fig. 1 attached thereto. Fig. 1$^a$ is a vertical sectional view illustrating a modified form of the structure shown in Fig. 1. Fig. 2$^b$ discloses a view similar to Fig. 2 showing the modified form illustrated in Fig. 1$^a$ secured thereto. Figs. 3, 3$^a$, 3$^b$ 4 and 5 are detached views of the locking arrangement shown in Figs. 1 and 2. Figs. 6, 7 and 8 are detached views of the locking arrangement shown in Figs. 1$^a$ and 2$^b$.

In carrying out my invention, I form the auxiliary or emergency tire A of steel or other metal to partially encircle the motor car wheel so that the tread on the same may as near as practicable coincide with the tread of the motor car wheel and so that there may be no increase of leverage tending to bend or break the axle. I also provide a series of holes D on that portion of the tire nearest the center which may be used in order to force the tire on to the wheel by means of a series of straps E provided with buckles F which pass through the same and around the spokes G, thus facilitating the application and retention of the tire in its correct position. These holes D may be flanged over or may be provided with eyelets in order to preserve the life of the strap and to further strengthen the tire. I also provide sight holes H in the side of the emergency tire A in order to readily ascertain whether the hooks I, to be hereafter more fully referred to, are correctly engaging with the rim J of the wheel A$^1$ of the car.

With the view of softening or deadening the metallic sound by the metal emergency or auxiliary tire A when the car is running over hard roads, I may also provide a rubber, leather, or other suitable strap or strips C attached to the periphery, which strap or strips will to a certain degree prevent skidding.

In place of having the emergency or auxiliary tire A wholly of metal and covered with a rubber or other band as above described and shown in Fig. 1, I may construct it partly of metal and partly of rubber or other suitable material, as shown in Fig. 1$^a$. In this construction, I turn up the outer edge so as to form a hollow flange B$^2$ for the reception of the rubber V or other material forming the tread and at the opposite side of the center line of the tire A, I rivet or otherwise fix a similar hollow flange B$^3$ for a like purpose.

In order to secure the emergency or auxiliary tire A to the rim J of the car wheel A$^1$ I provide around the lateral face of the tire A a convenient number of clips or clamping devices K. The clip or clamping device K consists of an eccentric disk L, (Figs. 3, 4 and 5), which is operated by a suitable spanner or key inserted in the square L$^1$ of the said clip or clamping device K. The eccentric disk L, acted upon by the spanner or key engages with one of the hooks I and presses it against the curved surface of the rim J. When all the eccentrics have been operated upon as before described, the clips and the rim are rigidly fixed to the wheel of the motor car and are jammed and locked in this position as will be hereinafter described. I also provide a spring washer R, see also Fig. 3$^b$ of helical formation of one or more turns with the terminal ends S and T, the one S of rectangular form and the other T of wedge form and so placed that the end T engages with V-shaped notches U in the end of the eccentric L while the other end S engages in a notch W in the interior of the jam-nut M thus insuring an absolute locking arrangement between the eccentric and the jam-nut M Fig 3$^a$.

In place of operating the eccentric L by means of the key or spanner as described, I form on the eccentric L, or suitably attached thereto, a toothed worm wheel or segment N see Figs. 6, 7 and 8 and I also provide at the side of and engaging with the said toothed worm wheel or segment N a worm O carried on a bracket P which is operated by a spindle Q and wheel Q¹, or finger or thumb-screw or other suitable means, Figs. 2ᵇ, 6, 7 and 8. The brackets P are riveted or bolted to the flange B of the auxiliary tire A.

Of course it is to be understood that the holes for forcing on the tire by means of worm wheel and worm together with the straps with buckles, likewise the forming of a strengthening flange at the inner edge, all as previously described, can all be applied with the same form of clip and eccentric where other types of emergency or auxiliary tires are in use.

Claims.

1. In a wheel structure the combination of a rim, a cushion tire, a detachable metal continuous auxiliary tire completely encircling the tread of said cushion tire circumferentially, and partially inclosing the cushion tire transversely, means for fastening said auxiliary tire to said rim, comprising a plurality of clips extending from said rim toward the wheel center, a plurality of apertures in said auxiliary tire, a plurality of eccentric bolts revolubly mounted in said clips and engaging said apertures, worm teeth on said eccentric bolts and worms engaging said teeth, said worms being carried by the rim of the wheel, and said clips being provided with hooks for gripping over the outside of said rim.

2. Device for attaching emergency tires to cushioned carriage wheels comprising a plurality of hook shaped clips gripping over the edge of the rim of the wheel, eccentric bolts revolubly mounted in said clips, openings in the emergency tire for said eccentric bolts, worm teeth on said eccentric bolts and worms engaging said teeth, said worms being carried by the emergency tire.

In testimony whereof I affix my signature in presence of two witnesses.

ALEX. TURNBULL.

Witnesses:
 JOHN LIDDLE,
 JOHN TRAIN LIDDLE.